US008065258B2

(12) United States Patent
Kim

(10) Patent No.: US 8,065,258 B2
(45) Date of Patent: Nov. 22, 2011

(54) COMPUTER-IMPLEMENTED METHOD OF DETERMINING VALIDITY OF A COMMAND LINE

(75) Inventor: Jung Su Kim, Seoul (KR)

(73) Assignee: NHN Business Platform Corporation, Seongnam-si (KR)

( * ) Notice: Subject to any disclaimer, the term of this patent is extended or adjusted under 35 U.S.C. 154(b) by 1371 days.

(21) Appl. No.: 11/568,729

(22) PCT Filed: May 20, 2005

(86) PCT No.: PCT/KR2005/001474
§ 371 (c)(1),
(2), (4) Date: Nov. 6, 2006

(87) PCT Pub. No.: WO2005/114439
PCT Pub. Date: Dec. 1, 2005

(65) Prior Publication Data
US 2009/0204560 A1    Aug. 13, 2009

(30) Foreign Application Priority Data

May 21, 2004   (KR) .................. 10-2004-0036490

(51) Int. Cl.
*G06F 17/00* (2006.01)
*G06N 5/02* (2006.01)

(52) U.S. Cl. ................ 706/47; 706/48; 706/62

(58) Field of Classification Search .............. None
See application file for complete search history.

(56) References Cited

U.S. PATENT DOCUMENTS

| 5,586,260 A | * | 12/1996 | Hu ............................. 726/12 |
| 5,892,903 A | * | 4/1999 | Klaus ......................... 726/25 |
| 2004/0068665 A1 | * | 4/2004 | Fox et al. ................... 713/201 |

FOREIGN PATENT DOCUMENTS

| JP | 14-049855 A | 2/2002 |
| JP | 14-063102 A | 2/2002 |
| JP | 14-123516 A | 4/2002 |
| JP | 2003-150513 | 5/2003 |
| JP | 2004-030286 | 1/2004 |
| KR | 2000-30907 A | 6/2000 |
| KR | 2003-16037 A | 2/2002 |
| WO | 01/80846 | 11/2001 |

OTHER PUBLICATIONS

Ryutov et al., T., "Integrated Access Control and Intrusion Detection for Web Servers", IEEE Transactions on Parallel and Distributed Systems, vol. 14, No. 9, pp. 841-850, Sep. 2003.*
Barnett, R., "Open Proxy Honeypots", Sourceforge.net, pp. 1-22, Mar. 30, 2004.*

* cited by examiner

*Primary Examiner* — Jeffrey A Gaffin
*Assistant Examiner* — Adrian Kennedy
(74) *Attorney, Agent, or Firm* — H.C. Park & Associates, PLC

(57) ABSTRACT

An approach is provided for determining a validity of a command line. A validity of the command line is determined based upon log information of a database, wherein the log information comprises network address information associated with the command line and time point information of the command line.

7 Claims, 6 Drawing Sheets

FIG. 3

| IP ADDRESS INFORMATION | INPUT TIME POINT INFORMATION | CONTENT INFORMATION (INCLUDING REQUEST CONTENT) | ... |
|---|---|---|---|
| 123.123.123.123 | 2004/04/16, 02:30:25 | ACCESS MAIN PAGE | ... |
| | 2004/04/16, 02:31:02 | INPUT SEARCH QUERY | ... |
| | 2004/04/16, 02:31:40 | PROVIDE SEARCH RESULT LIST | ... |
| | 2004/04/16, 02:32:16 | SELECT SEARCH RESULT | ... |
| | ... | ... | ... |

COMPUTER-IMPLEMENTED METHOD OF DETERMINING VALIDITY OF A COMMAND LINE

CROSS REFERENCE TO RELATED APPLICATIONS

This application is a U.S. National Application of International Application PCT Application No. PCT/KR2005/001474 filed on May 20, 2005, which claims the benefit of priority from Korean Patent Application No. 10-2004-0036490 filed on May 21, 2004. The disclosures of International Application PCT Application No. PCT/KR2005/001474 and Korean Patent Application No. 10-2004-0036490 are incorporated herein by reference.

TECHNICAL FIELD

The present invention relates to a method of determining the validity of a command line inputted from a terminal of a user, and more particularly, to a command line validity determination method capable of determining whether a command line is valid by using the request form of the command line or log information generated associated with the command line.

BACKGROUND ART

In a server/client model, a client accesses a server via a network and inputs a predetermined request, and the server responds the request to a terminal of a user.

The user may input the request in order not to obtain the response but another purpose.

For example, a search server providing search service may statistically analyze and use the search request of the user in order to generate a search result list according to preference of the user. Since a search result "frequently" selected by a user receiving a predetermined search result list whose relation with a search request is high and the preference of users is considered to be high, the search server distributes priority to the search result in order to preferentially provide the search result to users.

In this case, "search result selection" of the user is used as "a request for receiving information associated with the search result or accessing a webpage associated with the search result" or "a standard for generating a search result list". A user knowing the fact described above may repeatedly select an identical search result from a search result list provided by responding to a predetermined search query, thereby distributing the priority of a search result selected by the user. Of course, in case that the priority is distributed by repeatedly selecting the search result by the user, an original object that tries to preferentially provide a search result whose relation with the search result is high and preferred by users cannot be obtained.

Accordingly, in case that a user inputs a request for selecting a search result, it is necessary to determine whether the request is inputted with ill will. In case that the request is determined to be inputted with ill will, information associated with the search result is provided according to the request but is not preferable to be used as a standard for generating a search result list. As described above, it may be necessary to determine whether "a request" of a user, inputted to a predetermined system, is generated with ill will, which is against the object of the system.

Hereinafter, "command" used in the present specification indicates an inclusive concept including "a request" of a user, for performing a predetermined operation in a predetermined server system, "a conversation" or "information" of a user, for providing predetermined information to the server system. "The command" may be transmitted from a terminal of the user to the server system by transmitting "a command line" to the server system.

Korean Patent Application No. 10-2002-7010554 ("Title: A system and method to determine the validity of an interaction on a network, hereinafter, referred to as "application invention") discloses one of methods of determining the validity of a command line of a user. The Korean Patent Application designates a conversation inputted with ill will of a user as "an illegal conversation" in the specification.

The application invention includes 1) a step of collecting data including "collective method data" and "private characteristic data" from a user conversation on network, 2) a step of storing data in a database, 3) a step of building an estimation model by collective method and private characteristic data in order to identifying an illegal conversation with a network, and 4) a step of identifying an illegal conversation in the database by using the estimation model.

Also, the application invention discloses 'the number of a private user ID per search list click/unit time', 'the number of a private user ID per entry source/unit time', and 'the number of a private user ID per advertiser/unit time, which accepts a click capable of any application'.

Also, the application invention discloses 'a date of a click generating an income' and 'a time stamp of a click generating an income' as "private characteristic data".

However, the application invention determines whether a conversation is valid by using the estimation model whenever a conversation is inputted. That is, "acceptable but uncommon class (ABUC) value", "normal behavior class (NBC) value", and "unacceptable class value" are respectively computed 「with respect to one conversation」 and determine the conversation to be included in the class whose value is largest among them.

Accordingly, in case that the conversation is easily to be determined to be invalid by considering the pattern of the conversation, an identical system resource is used for respectively computing and comparing the ABUC value, the NBC value, and the UC value and the conversation is determined to be invalid, thereby unnecessarily consuming the system resource.

Also, there still exists the need of considering whether a proper determination standard for determining whether a predetermined conversation is valid exists, in addition to the determination standard selected by the application invention in order to establish the estimation model.

Accordingly, there is needed a method of providing various new determination standards which can precisely determine whether a command line of a user is valid, which can solve the problems of the conventional method.

SUMMARY OF THE INVENTION

According to the present invention, a method and system for determining the validity of a command line are provided, which can rapidly determine whether a command line inputted from a terminal having a predetermined network address is invalid by establishing block network address information.

Also, according to the present invention, a method and system for determining the validity of a command line are provided, which establishes network address information with respect to a network address as invalid suspect network address information in case that it is difficult to determine whether a command line inputted from a terminal having a predetermined network address is invalid and can more precisely determine whether a command line is valid by using at least two establishment procedures of determining whether the network address information is determined to be block network address information by using a command line further inputted from the network address later.

Also, according to the present invention, a method and system for determining the validity of a command line are provided, which can show a new determination standard that can determine whether a command line is valid and determine whether the command line is valid by considering all request format and request content of the command line.

TECHNICAL SOLUTIONS

According to an aspect of the present invention, there is provided is a method of determining command line validity, including: a step of maintaining a block network address database including block network address information; a step of receiving a command line from a terminal of a user; a step of extracting network address information included in the command line; a step of determining whether the network address information is the block network address information, with reference to the block network address database; a step of generating log information associated with the command line in case that the network address information is not the block network address information as the result of the determination, in which the log information comprises at least one of the network address information included in the command line, input time point information with respect to the input time point of the command line, and request content information; a step of recording the log information in a log database; and a step of determining the validity of the command line by using the log information.

The step of determining the validity of the command line by using the log information includes: a step of searching the log information including the network address information from the log information recorded in the log database; a step of extracting the input time point information included in the searched log information; and a step of determining the command line to be invalid in case that the entire or a part of the extracted input time point information has relation according to a predetermined rule.

The method further includes a step of determining the network address information as the block network address information in case that the command line is determined to be invalid as the result of the determination, and a step of recording the network address information in the block network address database.

BRIEF DESCRIPTION OF DRAWINGS

FIG. 3 is a diagram illustrating an example of log information recorded in a log database in an embodiment of the present invention;

DETAILED DESCRIPTION OF ILLUSTRATED EMBODIMENTS

Hereinafter, the present invention will be described in detail with reference to the attached drawings.

Figure 1:
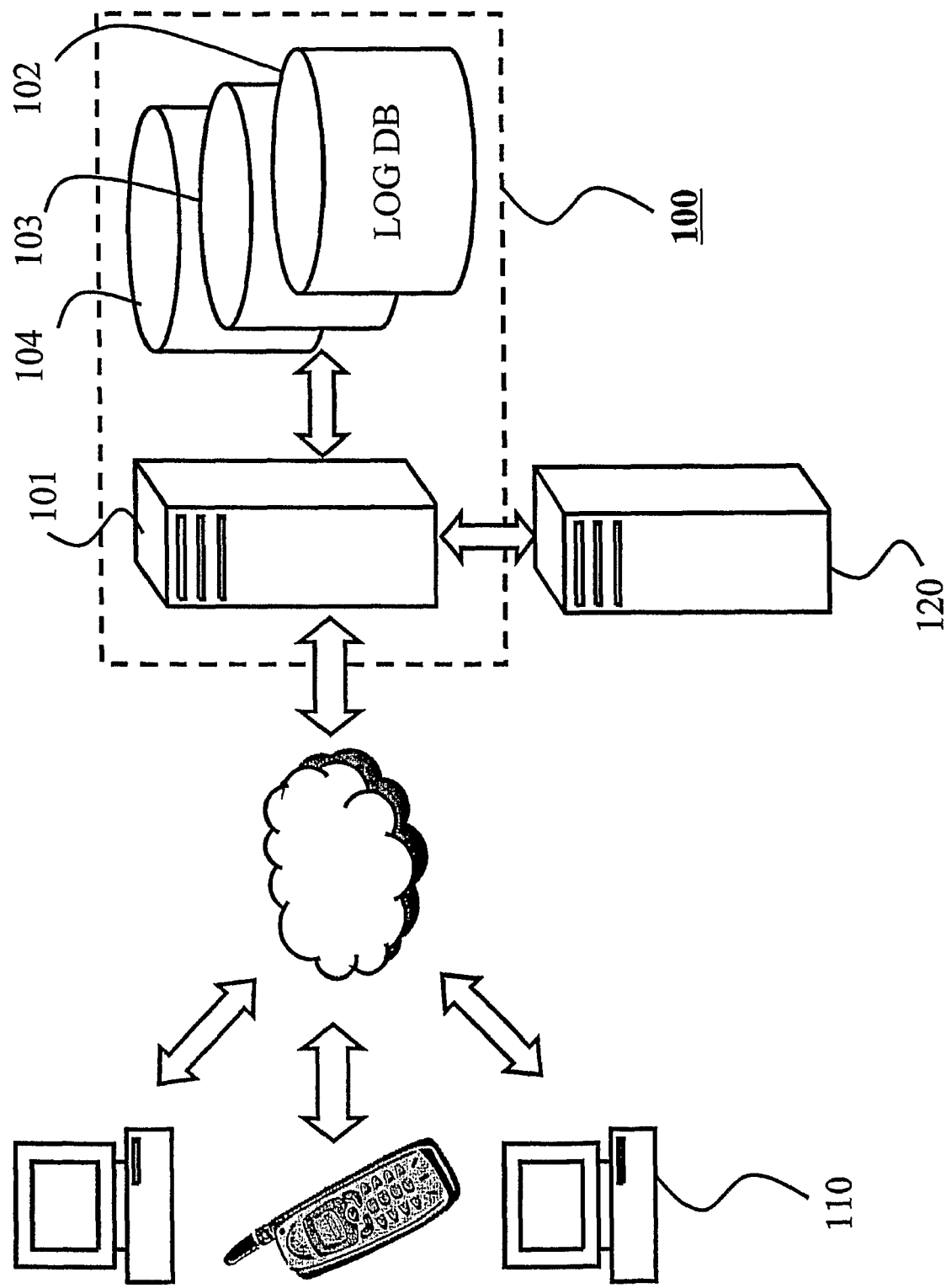
FIG. 1 is a diagram illustrating network connection of a determination system performing a command line validity determination method according to the present invention.

FIG. 1 is a diagram illustrating network connection of a determination system performing a command line validity determination method according to the present invention. A determination system 100 includes a determination server 101 and a log database 102 and may be connected to a terminal 110 of a user via a wired or wireless communication network. The determination server 101 may process a command line inputted from a user and provide a response according to a process result to the user.

Hereinafter, it will be described for example the determination system 100 determining the validity of the command line in case that a user inputs a keyword associated with search in a search server providing search service. However, this is only an illustrative example, and the server 120 indicates a server providing various services such as search service, game service, and reservation service according to each client/server model.

Also, the determination server 101 for determining the validity of a command line (or command line language) of the user may be embodied as the same apparatus as the search server 120 or is interworking with the search server 120.

Also, a case of using an IP address as an example of a network address will be described below, but this is only for illustrative example. All information used for identifying the position of a terminal in a network is included in the network address.

Figure 2:
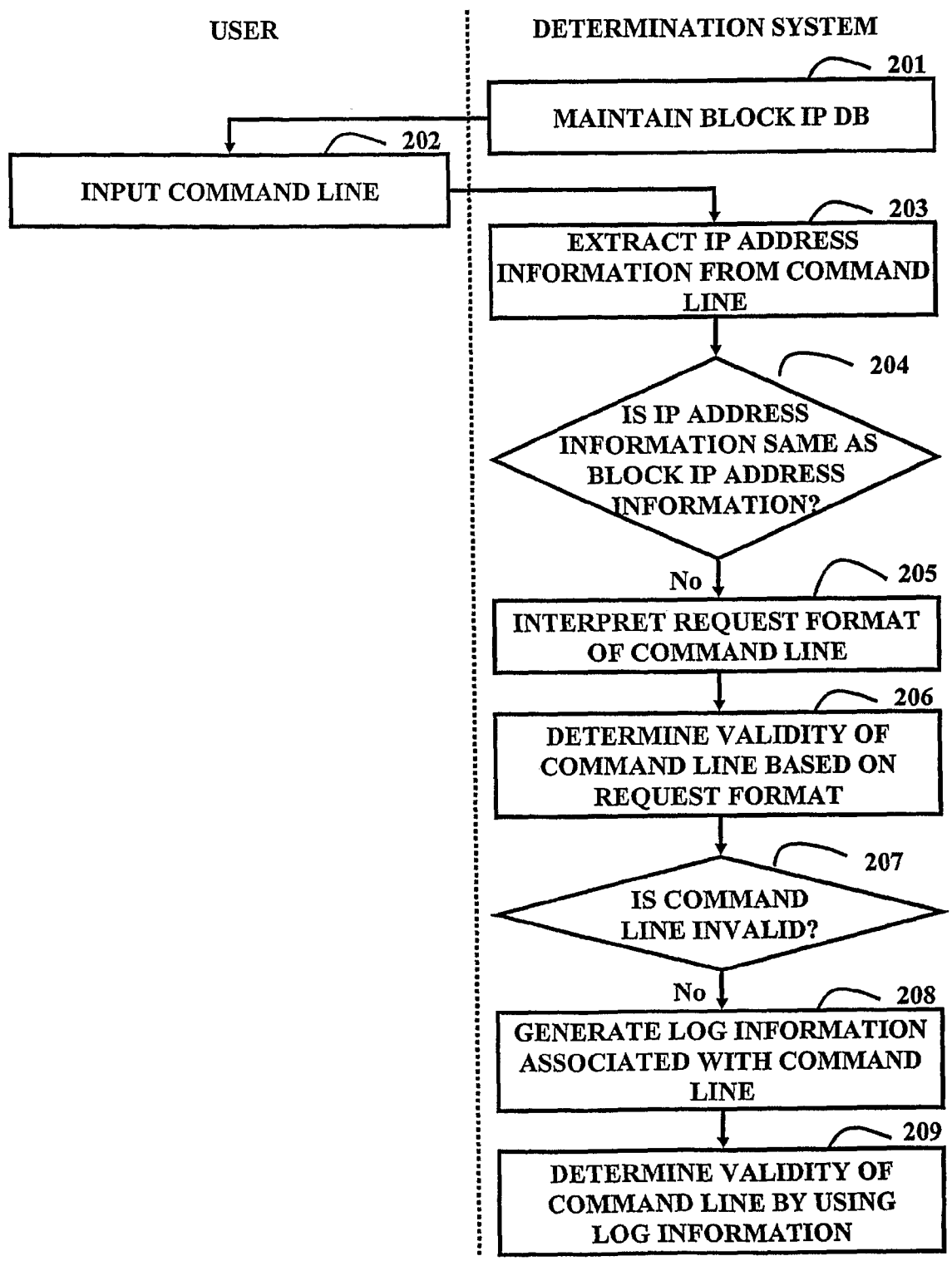
FIG. 2 is a flow chart illustrating a command line validity determination method according to an embodiment of the present invention.

FIG. 2 is a flow chart illustrating a command line validity determination method according to an embodiment of the present invention.

In step 201, a block IP database 103 including block IP address information is maintained. The block IP address information is selected according to a predetermined standard and indicates information on the IP address of a terminal, which is ill-disposed, having a high possibility of inputting an invalid command line. The procedure of determining the block IP address information will be described later.

In step 202, the search server 120 receives a command line from the terminal 110 of the user. As described above, "the command line" is information for inputting "a command" of the user, and "the command" is used as a concept including a request and conversation of the user.

The determination server 101 extracts IP address information included in the command line in step 203 and determines whether the extracted IP address information is block IP address information by referring to the block IP address database 103 in step 204. The extracted IP address information is on the IP address of the terminal 110 to which the command line is inputted.

As a determination result, in case that the extracted IP address information is the block IP address information, the determination server 101 does not generate log information associated with the command line. Accordingly, the procedure of determining whether the command line is valid by using the log information associated with the command line is not performed and the command line is automatically processed to be invalid. That is, in case that the command line is determined to be invalid by using the block IP address information, the determination server 101 may not perform the procedure after step 205.

The block IP address information may be information on an IP address of a terminal inveterately inputting a command line determined to be invalid by performing a command line validity determination method as described after or an IP address inputted by a manager of the determination system 100.

For example, in an embodiment in which an advertising expense is charged to an advertiser according to the number in which a predetermined search result is selected by users, a rival of the advertiser is possible to repeatedly input a command line selecting the search result with ill will in order to increase the advertising expense. Accordingly, the manager records IP address information on an IP address of a terminal connected to a network of known rival businesses as block IP address information in the block IP address database 103, thereby preventing the described above.

Also, according to another embodiment of the present invention, the determination system 100 further includes permit IP address database (not shown). For example, permit IP address information is on an IP address of a terminal of the advertiser or information on an IP address of a terminal of manager. The determination server 101 may treat the IP address information as the same as the block IP address information or determine IP address information on the terminal of the manager or the advertiser, which inputs a command line which is invalid though without ill will as the permit IP address information to manage separately from the block IP address information. The manager may input a command line for management, and the advertiser may input a command line in order to check whether the advertisement is normally performed.

In case that the IP address information is the permit IP address information, the determination server 101 may determine the command line to be invalid or generate and record log information on the command line, different from the case of the block IP address information.

The determination server 101 interprets the request form of the command line in step 205 and determines the validity of the command line based on the request form in step 206.

According to still another embodiment, in case that the command line is determined to be invalid by determining based on the request form, a procedure of determining the command line after step 207 may not be performed.

The determination server 101 generates log information associated with the command line in step 208. The log information may include the extracted IP address information, input time point information on the time point of inputting the command line to the search server 120, and request content information included in the command line.

The request content information included in the command line may information for selecting a search result by a user. That is, in case that the user inputs a predetermined search query to the search server 120 to request search and the search server 120 generates a search result list corresponding to the search query and provides to the user, the user may select a search result among the search result list and the command line includes request content information for selecting the search result.

In step 209, the determination server records the log information in the log database 102. FIG. 3 is a diagram illustrating an example of log information recorded in the log database 102. As illustrated in FIG. 3, according to still another embodiment of the present invention, the log information may be arranged according to a time point of inputting a command line or systemically recorded associated with the IP address information. Also, in the log database 102, log information 301 associated with an access in case that the user accesses the search server 120, log information associated with information that the search server 120 or the determination server 101 provides to the user, for example, log information 302 associated with the search result list provided to the user may be recorded.

In step 210, the determination server 101 determines the validity of the command line by using the log information. The determination server 101 may determine the validity of the command line by using only the log information associated with the command line or further using at least one log information recorded in the log database 102.

Hereinafter, step 206 of determining the validity of a command line based on a request form and step 209 of determining the validity of a command line by using log information according to each embodiment will be described in detail.

1. A Procedure of Determining the Validity of the Command Based on the Request Form of a Command Line (1) In Case that the Validity of a Command Line is Determined Based on an HTTP Version of the Command Line According to the present embodiment, the request form is the version of Hyper Text Transfer Protocol (HTTP) used for writing the command line.

In order to input a command line to the search server 120 with ill will, a user does not manually generate a command line but may use a program for "automatically" generating a predetermined command line.

Since, generally, a command line is written according to HTTP and lower the version of the HTTP more simple and widely known the content, the program is written by using a version lower than a new version. In case that a command line is written by using HTTP of the version not generally used, the command line is highly possible to be invalid.

For example, in case that HTTP/1.1 version is generally used, the determination server 101 selects the HTTP/1.1 version as a valid version. In case that the HTTP version of the command line is identified to be written by a version in addition to the valid version, that is, HTTP/1.1, for example, HTTP/1.0 or a version after the HTTP/1.1, the determination server 101 may determine the command to be invalid. A standard for determining the validity of a command line may be changed according to time flow.

(2) In Case that the Validity of a Command Line is Determined Based on Additional Information Included in the Command Line According to the present embodiment, the request form is whether the additional information included in the command line exists. For example, the additional information is browser information if a web browser installed at the terminal or URL information of a webpage accessed by the user just before.

Generally, in case that accessing the web browser and transmitting a command line, the web browser may insert the URL information of the webpage accessed by the web browser just before into the command line and transmit according to HTTP.

Accordingly, a command line not including the additional information may be automatically generated by a command line automatic generation program. Accordingly, the determination server 101 may reflect whether the additional information is included in the command line on determining the validity of the command line.

(3) In Case that the Validity of a Command Line is Determined Based on Identification Information Included in the Command Line The determination server 101 allows the identification information is included in the command line for each request content information and IP address information of a terminal. Accordingly, if the input number of the command line including the identification information is computed, it may be determined how many times the command line including the identical request content is inputted from a terminal whose IP address information is the same.

A user generally once inputs a command line for certain request, for example, a command line for selecting a search result. Accordingly, the determination server 101 may determine a command line including the identification information to be invalid in case that the command line having the same identification information is inputted more than twice.

(4) In Case that a Command Line is Inputted in a Certain Period after a Predetermined Event Occurs In case that a predetermined event occurs and a command line generated according to the event is inputted in a too short time after the event occurs, the determination server 101 may determine the command line to be invalid.

For example, in the event, the search server 120 provides a predetermined search result list to the user according to the search request of the user. The user receiving the search result list may input a command line for selecting a certain search result included in the search result list.

In this case, "a human" must pass through serial procedures of "recognizing the search result list and grasping a proper search result and selecting" in order to input the command line and a certain time is necessary for performing the procedure.

Accordingly, in case that a time interval from the time point of providing the search result list to time point that the user inputs the command line including a search result is too short, for example, 0.5 seconds, the determination server 101 may determine the command line to be invalid.

Figure 4:
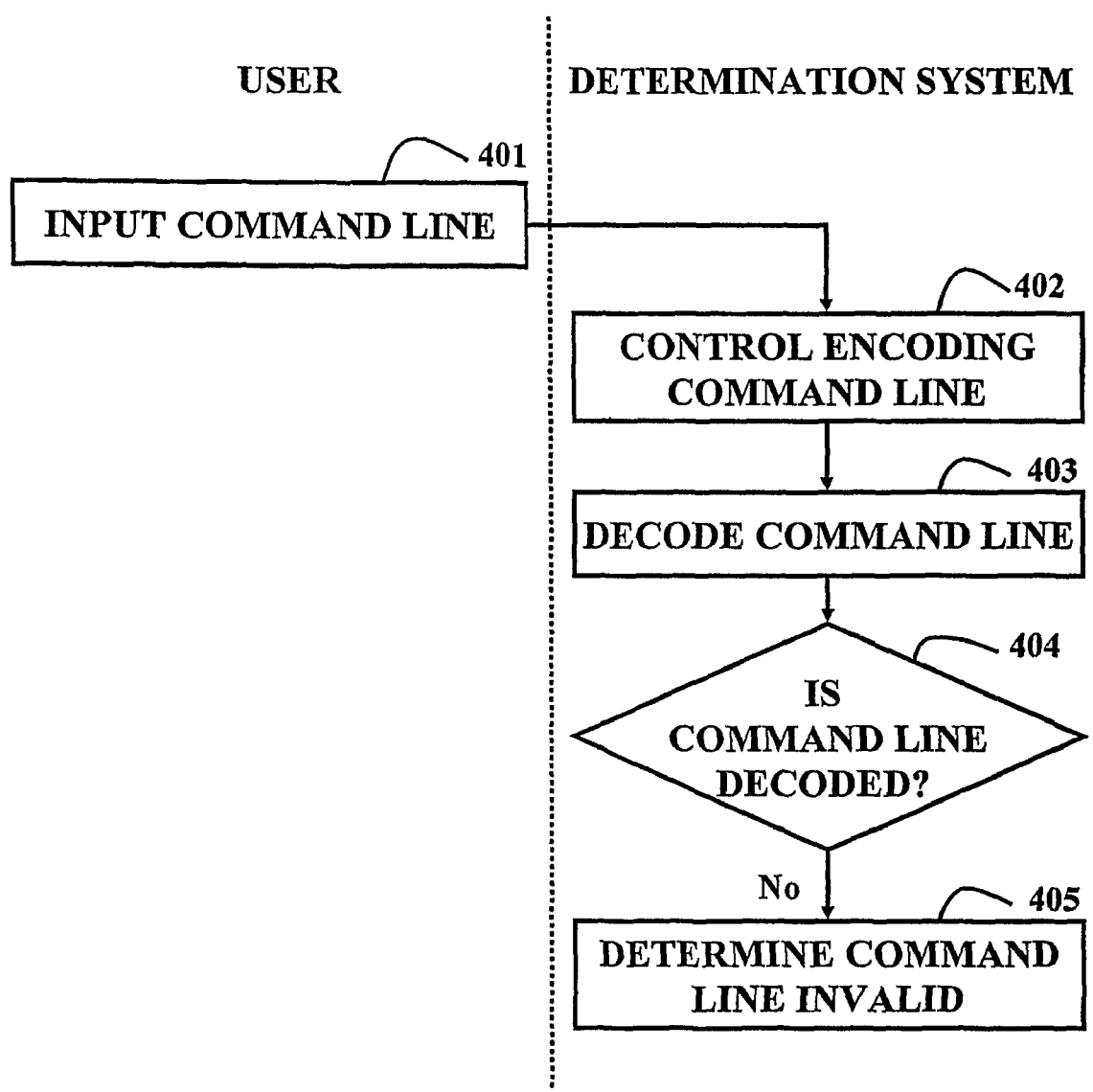
FIG. 4 is a flow chart illustrating a case of determining the validity of a command line by using encode/decode method according to another embodiment of the present invention.

(5) In Case that the Validity of a Command Line is Determined by Using an Encode/Decode Method A case of determining the validity of a command line by using an encode/decode method according to the present embodiment is described with reference to FIG. 4.

In case that a user inputs a command line via a predetermined webpage in step 401, the determination server 101 controls to inset encoded information in the command line in step 402.

For example, information on via which channel the command line has been inputted or information of the channel with which the command line has been inputted in association may be encoded and included.

According to each embodiment, the encoding method may be according to encoding protocol provided from the HTTP. Also, according to still another embodiment of the present invention, the determination server 101 may provide a program including the encoding algorithm as a plug-in form to the terminal 110, and the terminal 110 may encode a command line according to the encoding algorithm by installing the program.

In step 403, the determination server 101 receives the encoded command line and decodes.

In step 404, in case that the determination server 101 identifies that the command line is not encoded or not decoded by the decoding method, the determination server 101 determines the command line to be invalid in step 405.

2. A Procedure of Determining the Validity of a Command Line by Using Log Information (1) In Case that the Input Time Point of a Command Line has a Predetermined Rule as a Case in which a Command Line Including "Certain IP Address Information" is Inputted at Regular Time Interval The determination server 101 searches log information including IP address information included in the command line from log information recorded in the log database 102. According to still another embodiment of the present invention, the determination server 101 may search only log information recorded in a certain period from log information including the IP address information.

If the searched log information is first log information, the determination server 101 extracts input time point included in the first log information and determines the command line to be invalid in case that a part or the entire of the extracted input time point information has relation according to a predetermined rule.

For example, in case that a time point of inputting the command line is "2004/04/02, 09:00:30" and a input time point included in the first log information is "2004/04/02, 08:50:30", "2004/04/02, 08:40:30", "2004/04/02, 08:30:30", and "2004/04/02, 08:20:30", it is known that a command line associated with the first log information is inputted to the search server 120 at 10 minutes intervals. The regularity may include all case in which mathematical regularity is found, for example, a case in which the time interval is increased in arithmetic progression or geometric progression, in addition to the case in which the time interval between the input time points of inputting the command line.

In case that the regularity in the time point of inputting the command line including certain IP address information is acknowledged, the command line may be a command line generated by using a program of automatically generating a command line. Accordingly, the determination server 101 determines the command line to be invalid.

According to still another embodiment of the present invention, the determination server 101 can determine the command line to be invalid only in case that the number of input time point information according to a predetermined rule from the searched input time point information is more than a certain number.

Also, according to yet another embodiment of the present invention, the determination server 101 may identify log information including the input time point information according to the rule and determine all command lines associated with the identified log information to be invalid. That is, a group of command lines determined to have the regularity in the time point of the command lines inputted from a terminal having a predetermined IP address is all processed to be invalid.

Also, according to a further embodiment of the present invention, the determination server 101 may record the IP address information as the block IP address information in the block IP address database 103 in case that the command line is determined to be invalid.

(2) In Case that the Time Point of Inputting a Command Line, which has a Predetermined Regularity as a Case in which a Command Line Including "Certain Request Content Information" is Inputted at Regular Time Intervals The determination server 101 searches log information including the request content information included in the command line from the recorded log information recorded in the log database 102. According to another embodiment of the present invention, the determination server 101 may search only log information recorded in a certain period from the log information including the IP address information.

If the searched log information is first log information, the determination server 101 extracts input time point information included in the first log information and determines the command line to be invalid in case that a part or the entire of the extracted input time point information has relation according to a predetermined rule.

For example, in case that a time point of inputting the command line is "2004/04/02, 09:00:30" and a input time point included in the first log information is "2004/04/02, 08:50:30", "2004/04/02, 08:40:30", "2004/04/02, 08:30:30", and "2004/04/02, 08:20:30", it is known that a command line associated with the first log information is inputted to the search server 120 at 10 minutes intervals. The regularity may include all case in which mathematical regularity is found, for example, a case in which the time interval is increased in arithmetic progression or geometric progression, in addition to the case in which the time interval between the input time points of inputting the command line.

In case that the regularity in the time point of inputting the command line including certain IP address information is acknowledged, the command line may be a command line generated by using a program of automatically generating a command line. Accordingly, the determination server 101 determines the command line to be invalid.

According to still another embodiment of the present invention, the determination server 101 can determine the command line to be invalid only in case that the number of input time point information according to a predetermined rule from the searched input time point information is more than a certain number.

Also, according to yet another embodiment of the present invention, the determination server 101 may identify log information including the input time point information according to the rule and determine all command lines associated with the identified log information to be invalid. That is, a group of command lines determined to have the regularity in the time point of the command lines inputted from a terminal having a predetermined IP address is all processed to be invalid.

Also, according to a further embodiment of the present invention, the determination server 101 may record the IP address information as the block IP address information in the block IP address database 103 in case that the command line is determined to be invalid.

(3) In Case that a Abnormally Large Number of Command Lines are Inputted from a Terminal Having a Certain IP Address for a Certain Period The determination server 101 computes the first number of command lines inputted from each terminal for a first period by using log information recorded in the log database 102 for the first period. A network address may be used in order to identify each terminal. That is, command lines inputted from a terminal having the same network address may be understood to be inputted from one terminal. Only, it is an exception that the network address is a network address of a proxy server or a shared unit.

The determination server 101 computes the second number of command lines inputted from a terminal having the network address included in the command line for a second period by using log information recorded in the log database 102 for the second period.

The first period may be the same as the second period. It is preferably that the first period is longer than the second period. Also, the period of a certain period of time such as morning, afternoon, evening, midnight, and dawn is selected as the second period, thereby determining the validity of a command line by considering the pattern of inputting the command line for each period. For example, since the number of inputting command lines is notably reduced about 4 o'clock at dawn, the validity may be determined by considering this.

The determination server 101 may determine the validity of the command line by using the first number and the second number for each the terminal.

For example, the determination server 101 computes the average of the first number for each the terminal and comparing the second number with the average, thereby determining the validity of the command line. In case that the second number is more than the average or a value in which a predetermined value is added to the average, the determination server 101 may determine the command line to be invalid. Also, in case that the ratio between the average and the second number is computed and the ratio is more than a predetermined value, the determination server 101 may determine the command line to be invalid.

Also, the determination server 101 computes the maximum value of the first number for each the terminal or computes the dispersion value of the first number for each the terminal and compares the maximum value or the dispersion value with the second number, thereby determining the validity of the command line.

Also, according to another embodiment of the present invention, in case that the command line is determined to be invalid, the determination server 101 may record the IP address information as block IP address information in the block IP address database 103.

On the other hand, in the above, the case of using the first number for each the terminal or the average of the first number is described for example. The method described above may be applied to all cases in which the first number is compared with the second number in each determination procedure described later to determine whether the first number is abnormally larger than the second number. Also, the concrete method as described above, in which the first number is compared with the second number, is no more than illustrative. The scope of the present invention is not restricted by the method and applied to all methods of determining the validity of a command line by comparing the first number having a predetermined meaning with the second number having another predetermined meaning.

(4) In Case that the Number of Inputting a Certain Command Line for a Certain Period is Abnormally Large The determination server 101 respectively computes the first number of command lines inputted for a first period according to request content information by using log information recorded in the log database 102 for the first period. That is, the number of command lines including the same request content information is respectively computed from command lines inputted for the first period.

The determination server 101 computes the second number of log information including request content information included in the command line by using log information recorded in the log database 102 for a second period. The second number is the number of command lines including request content information identical with the command line from the command lines inputted for the second period.

The determination server 101 may determine the validity of the command line by using the first number and the second number for each the request content information. That is, the determination server 101 compares the first number and the second number for each the request content information and may determine the command line to be invalid in case that the second number is determined to be abnormally larger than the first number. A concrete example of comparing the first number with the second number is as the described above.

(5) In Case that the Number of Inputting Command Lines for a Certain Request From a Terminal Having a Certain IP Address for a Certain Period is Abnormally Large The determination server 101 computes the first number of command lines inputted for a first period for each piece of request content information by using log information recorded in the log database 102 for the first period. That is, it is respectively computed how many command lines including predetermined request content information are inputted from a predetermined server. IP addresses may be used for determining each terminal. That is, command lines inputted from the same IP address may be understood to be inputted from one terminal.

The determination server 101 computes the second number of command lines including the request content information from the command lines inputted from the terminal having the IP address included in the command line for the second period by using log information recorded in the log database 102 for the second period.

The first period may be the same as the second period. It is preferably that the first period is longer than the second period. Also, the period of a certain period of time such as morning, afternoon, evening, midnight, and dawn is selected as the second period, thereby determining the validity of a command line by considering the pattern of inputting the command line for each period. For example, since the number of inputting command lines is notably reduced about 4 o'clock at dawn, the validity may be determined by considering this.

The determination server 101 compares the first number and the second number for each the request content information and may determine the command line to be invalid in case that the second number is abnormally larger than the first number.

Also, according to another embodiment of the present invention, in case that the command line is determined to be invalid, the determination server 101 may record the IP address information as block IP address information in the block IP address database 103.

(6) In Case that First Information Associated with a Second Command Line does Not Exist The search server 120 receives a search query from a user, generates a search result list corresponding to the search query, and provides to the user. The user receiving the search result list selects a search result from the search result list, and the search server 120 provides information corresponding to the selected search result or relays a webpage associated with the search result to the user. As described above, many pieces of information are transmitted and received between the search server 120 or the determination server 101 and a terminal of a user.

In the present specification, in case that the information communicated between the search server 120 or the determination server 101 and the user has the sequential relation between cause and effect, information which is a cause is defined as first information and result information generated based on the first information is defined as second information. Also, the information includes a command line.

For example, the search result list is generated based on the search query, and the search query may be defined as a first command line and the information may be defined as second information.

The determination server 101 generates log information corresponding to the information communicated with the terminal of the user and records in the log database 102. The log information includes the information or information on the time point of transmitting and receiving the information.

In case that a command line inputted from the terminal is determined to be a second command line by considering the request content, the determination server 101 searches log information corresponding to first information (or a first command line) associated with the command line by referring to the log database 102. The log information corresponding to the first information associated with the command line may be searched with reference to the content of a query included in the second command line and IP address information included in the second command line.

Since a second command line is generated based on first information, if log information corresponding to the first information is not searched, the command line is not inputted according to a normal procedure. Therefore, the determination server 101 may determine the command line to be invalid.

(7) In Case that First Information Associated with a Second Command Line does Not Exist—in Case that Information Included in a Command Line is Used In case that a command line is inputted according to a normal procedure, for example, a predetermined webpage is provided according to a request for providing a webpage from a user and an additional request by using information included in the webpage is inputted from the user, the additional request is premised on providing the webpage.

Accordingly, the determination server 101 may allow history information as described above to be included in a command line in order to determine the validity of the command line. Since the history information becomes a standard for determining the validity of the command line, it is preferable that the history information is controlled to be encoded and included in the command line.

The determination server 101 receives a first command line from a terminal of a user and provides a webpage including predetermined information to the user according to the first command line.

The user may input a second command line based on the information. For example, the first command line may be a search request including a predetermined search query, and the second command line may be a command of selecting a predetermined search result from a search result list.

In this case, the determination server 101 allows history information to be included in the second command line. The history information includes URL information of a webpage accessed by the terminal just before (the URL information may be provided from a web browser), a first IP address of the terminal, or a second IP address of a terminal inputting the first command line. In a normal case, the second IP address of the terminal is identical with the first IP address of a terminal inputting the first command line.

According to the configuration as described above, in case that a predetermined command line is inputted, the determination server 101 may determine whether the command line is valid by using history information of the command line.

For example, in case that URL information corresponding to the present or previous webpage is not included in the command line, the determination server 101 may determine the command line to be invalid.

In case that the URL information is included in the command line, the URL is not the URL of a webpage that the terminal normally accesses now or accessed before in order to input a command line, the determination server 101 determines the command line to be invalid.

Also, in case that first IP address information of a terminal inputting a first command line is not included in a second command line capable of being generated premised on inputting the first command line, the determination server 101 determines the command line to be invalid.

Also, the determination server 101 compares first IP address information included in the second command line with second IP address information and determines the second command line to be invalid in case that the first IP address information is not identical with the second IP address information.

(8) In Case that the Number of a Certain Query is Abnormally Large in a Certain Network Group for a Certain Period The determination server 101 identifies a network group associated with the IP address based on the IP address information.

For example of the network group, there is a network class according to IPv4. The network class is with respect to the mechanism of dividing an IP address space. In an IP address system according to the IPv4 formed of four octets having 8 bit, a network accessed by a terminal having an IP address may be identified from the IP address information. For example, a class C network has IP addresses from 192.0.0.0 to 223.255.255.0, and three octets from the head are used for indicating a network number.

The determination server 101 respectively computes the first number of command lines inputted from each terminal for a first period for each piece of request content information by using log information recorded in the log database 102. The determination server 101 may determine a command line inputted from a terminal having the same IP address to be inputted from one terminal. Only, it is an except that the network address is an IP address of a proxy server or a shared unit.

The determination server 101 computes the second number of a command line including IP address information associated with the network class and the request content information for a second period by using log information recorded in the log database 102.

The determination server 101 compares the first number with the second number and may determine the command line to be invalid in case that the second number is abnormally larger than the first number.

Accordingly, according to the present embodiment, it may be sensed that a predetermined command line is inputted with ill will by using a plurality of terminals accessing an identical network group such as an identical network class.

On the other hand, though the IPv4 method is described as an example in the embodiment, the present invention may be applied to an IP address method employing a method of classifying an IP address space into at least one group, in addition to the described above.

(9) In Case that Command Lines Whose Identification Information is the Same is Repeatedly Inputted In the present embodiment, in case that a command line requesting predetermined information is received from a terminal of a user, the determination server 101 controls the information or identification information associated with the IP address of the terminal to be included in the command line.

Also, determination server 101 refers to identification information included in the command line and determines the number of inputting a command line including the identification information. In case that a plurality of command lines including the identification information are inputted, the determination server 101 determines the command line to be invalid.

In the above, the procedure of determining the validity of a command line based on a request format (step 206) and the procedure of determining the validity of a command line by using log information (step 209) are concretely described. The determination server 101 may select at least one of the determination methods as described above and may determine whether the command line is valid by synthetically examining the determination result according to each determination method. Also, the determination server 101 adds a weight to each determination result and computes the entire determination result, thereby determining the validity of the command line.

On the other hand, the determination server 101 determines the validity of a command line by using log information as described in the 2. (1) through (3), (4) and determines IP address information included in the command line as block IP address information in case that the command line is determined to be not valid.

According to another embodiment of the present invention, the determination server further maintains an invalid suspect IP address database 104 including invalid suspect IP address information in addition to the block IP address database 103 and may "gradually" determine whether a command line inputted from a terminal having a predetermined IP address is invalid.

In case that the IP address information is determined to be invalid suspect IP address information, log information is generated in association with the command line. In this case, the command line is "a first command line" and the log information is "first log information".

The determination server 101 searches log information including the IP address information with reference to the log database 102, and the searched log information is "second log information". Also, according to still another embodiment of the present invention, the determination server 101 may search only second log information associated with command lines inputted for a predetermined period by using input time point information included in log information.

The determination server 101 determines whether the IP address information is block IP address information by using the first log information and the second log information. In this case, the determination server 101 determines whether the command line is invalid by using the determination method described in 2. (1) through (3) and may determine the IP address information as block IP address information in case that the command line is determined to be invalid.

For example, in case that a command line whose IP address is 123.25.29.01 is inputted at 2 o'clock Apr. 17, 2004 and 4 o'clock Apr. 17, 2004 and a command line is inputted again from the terminal at 6 o'clock Apr. 17, 2004, it is considered as difficult to precisely determine whether the command line inputted at 6 o'clock, the determination server 101 records IP address information on the IP address in the invalid suspect IP address database 104.

After, in case that a command line is inputted again from a terminal having the IP address, the determination server 101 identifies a input time point of the command line. In case that the input time point is 8 o'clock Apr. 17, 2004, the determination server 101 determines the command line inputted at intervals of 2 hours to be a command line generated by a command automatic generation program and determines the command line to be invalid. Also, the IP address information is deleted from the invalid suspect IP address database 104 and recorded in the block IP address database 103, thereby regarding all command lines inputted from the terminal as invalid.

Also, according to another embodiment of the present invention, a plurality of invalid suspect IP address databases may exist, and two steps or more of determination procedure may be performed in order to determine a predetermined IP address to be a block IP address.

According to the configuration, in case that it is difficult to determine whether IP address information of a terminal inputting the command line is block IP address information by only log information on previously inputted command lines, the IP address information is determined to be invalid suspect IP address information. After, a command line including the IP address information is more observed and it is determined whether the IP address information is determined to be block IP address information, thereby precisely determining whether a predetermined command line is invalid.

Also, according to another embodiment of the present invention, in case that a command line including block IP address information recorded in the block IP address database 103 is inputted or a command line is determined to be invalid based on the request format of a command line, as described above, the determination server 101 does not generate/record log information associated with the command line. Accordingly, system resource required in processing log information associated with the command line can be saved.

Also, in case that block IP address information is used and a user previously inputting a command line with ill will tries to input a command line, hiding ill will by using another method, all command lines inputted from a terminal having a block IP address are determined to be invalid, thereby incapacitating all command lines inputted from the terminal with ill will.

On the other hand, the determination server 101 may not give any answer with respect to a command line determined to be invalid. Also, the determination server 101 may allow a predetermined effect to be generated with respect to a command line determined to be invalid. For example, in case that the command line is a request for selecting a search result from a search result list provided by the search server 120, the search server 120 may transmit information associated with the selected search result regardless of whether the command line is invalid. Only, in case that the command line is used as a standard for charging an advertiser providing advertisement in association with the search result or determining preference of a user selecting the search result, the command line determined to be invalid is not preferable to use the standard.

Also, the embodiments of the present invention include a computer readable medium including a program instruction for executing various operations realized by a computer. The computer readable medium may include a program instruction, a data file, and a data structure, separately or cooperatively. The program instructions and the media may be those specially designed and constructed for the purposes of the present invention, or they may be of the kind well known and available to those skilled in the art of computer software arts.

Figure 5:
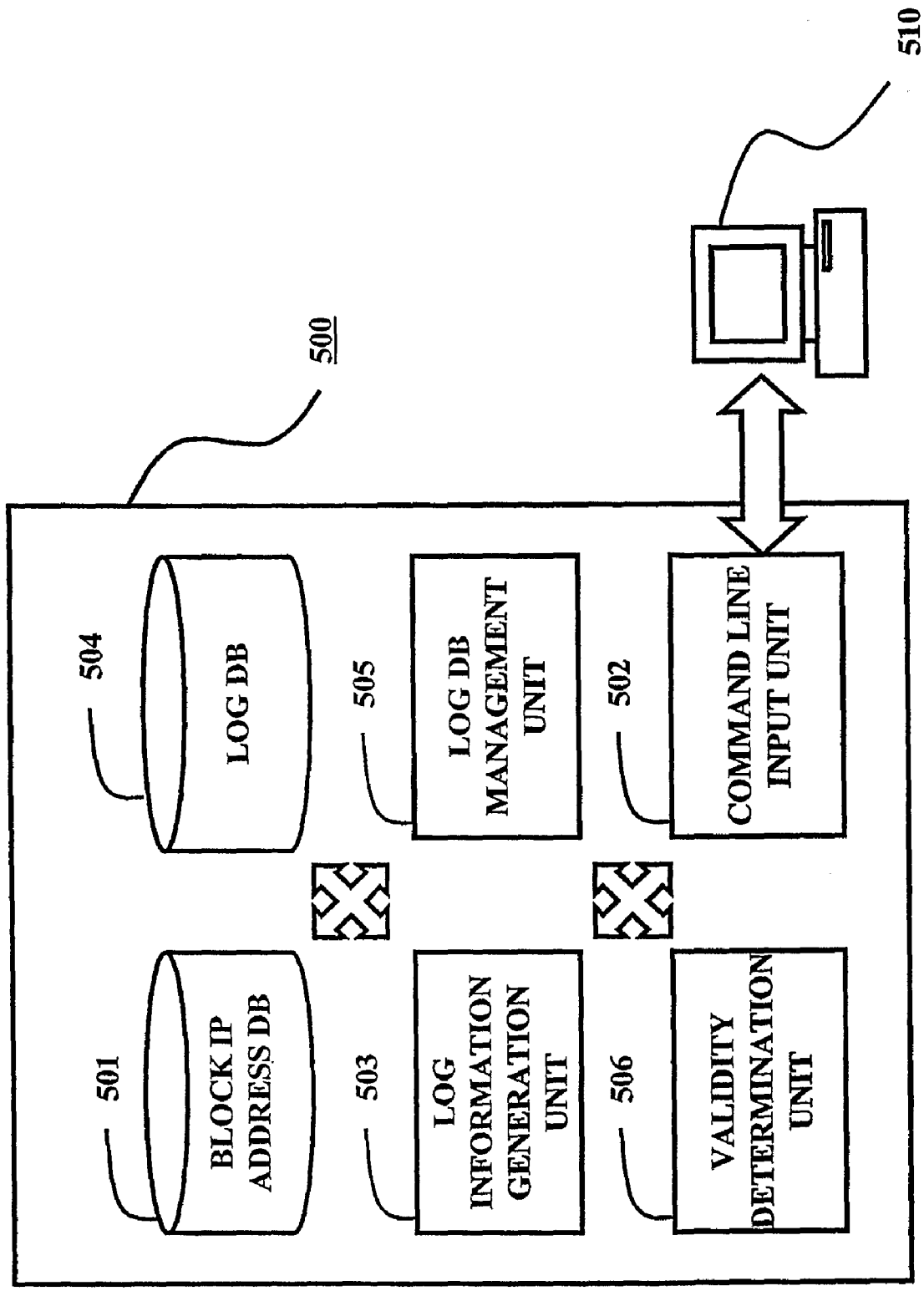
FIG. 5 is a block diagram illustrating the configuration of the inside of a determination system according to still another embodiment of the present invention.

Hereinafter, a determination system 100 determining the validity of a command line according to another embodiment of the present invention will be described. FIG. 5 is a block diagram illustrating the inside of the determination system 100. The determination system 100 or 500 includes a block IP address database 501, a command input unit 502, a log information generation unit 503, a log database 504, a log database management unit 505, and validity determination unit 506.

The block IP address database 501 includes block IP address information. The block IP address information is used for incapacitating a command line inputted from a terminal having a predetermined IP address as described later.

The command input unit 502 generates log information associated with the command line. The log information includes IP address information included in the command line, input time point information with respect to the input time point of the command line, and request content information included in the command line.

According to the present embodiment, the log information generation unit 503 determines whether the IP address information included in the command line is block IP address information by referring to the block IP address database 501 and generates log information associated with the command line. In case that the IP address information is determined to be block IP address information, the log information generation unit 503 does not generate log information associated with the command line.

Also, in case that the IP address information is block IP address information, the validity determination unit 506 determines the command line to be invalid.

The log database management unit 505 records the log information in the log database 504.

The validity determination unit 506 determines the validity of the command line by using log information generated associated with the command line or at least one piece of log information recorded in the log database 504.

Since the concrete configuration of determining the validity of a command line by using log information is explained in the described embodiments, the detailed description will be omitted in the present embodiment.

Figure 6:
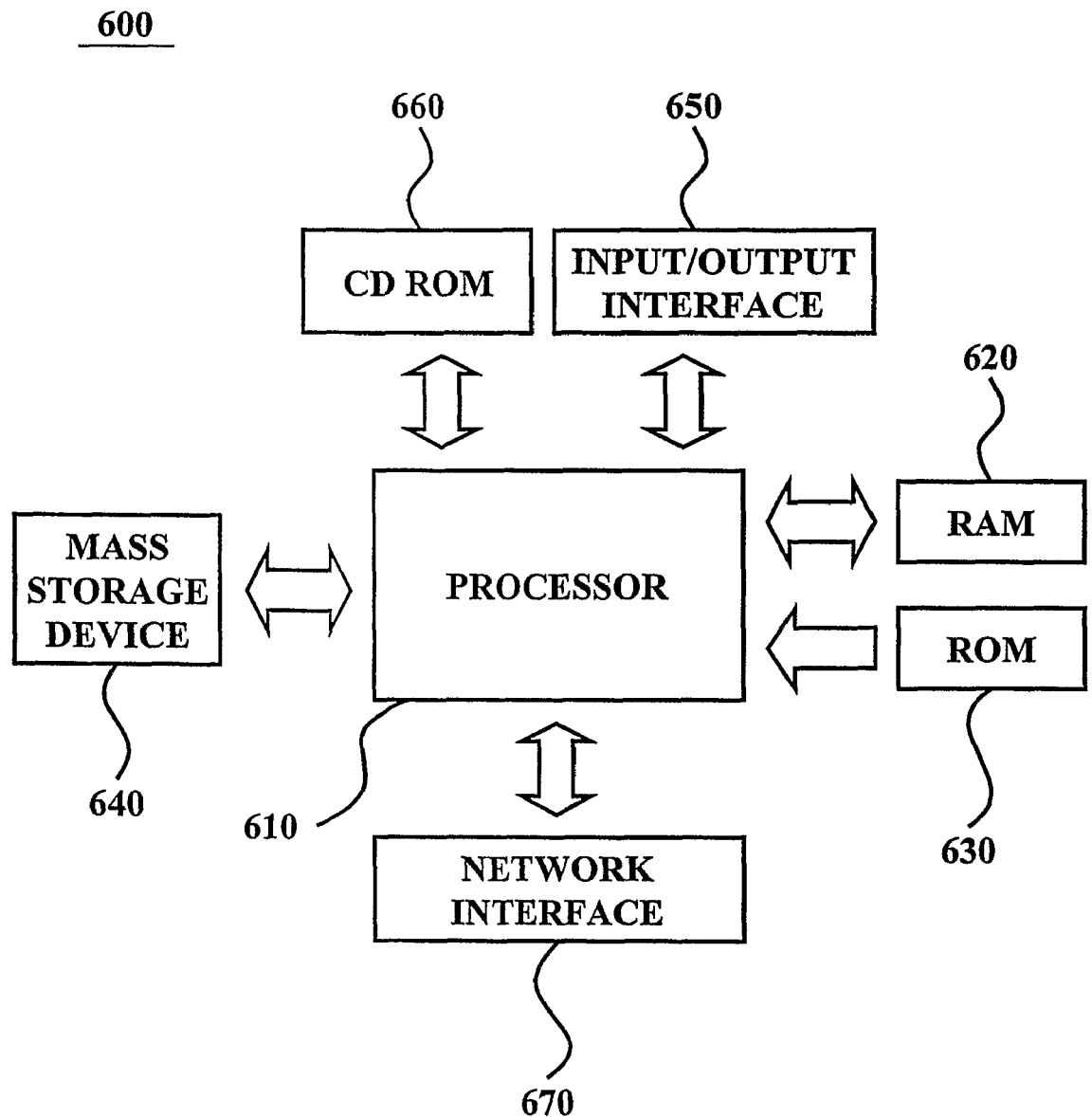
FIG. 6 is a block diagram of the configuration of the inside of a general use computer apparatus that can be employed to perform the command line validity determination method according to the present invention.

FIG. 6 is a block diagram illustrating the inside of a general use computer apparatus capable of being employed to perform the method of determining the validity of a command line, according to the present invention.

A computer apparatus 1000 includes at least one processor 1010 connected to a main memory device including a RAM (Random Access Memory) 1020 and a ROM (Read Only Memory) 1030. The processor 1010 is also called as a central processing unit CPU. As well-known to the field of the art, the ROM 1030 unidirectionally transmits data and instructions to the CPU, and the RAM 1020 is generally used for bidirectionally transmitting data and instructions. The RAM 1020 and the ROM 1030 may include a certain proper form of a computer readable recording medium. A mass storage device 1040 is bidirectionally connected to the processor 1010 to provide additional data storage capacity and may be one of the computer readable recording medium. The mass storage device 1040 is used for storing programs and data and is an auxiliary memory. A particular mass storage device such as a CD ROM 1060 may be used. The processor 1010 is connected to at least one input/output interface 1050 such as a video monitor, a track ball, a mouse, a keyboard, a microphone, a touch-screen type display, a card reader, a magnetic or paper tape reader, a voice or hand-writing recognizer, a joy stick, and other known computer input/output unit. The processor 1010 may be connected to a wired or wireless communication network via a network interface 1070. The procedure of the described method can be performed via the network connection. The described devices and tools are well-known to those skilled in the art of computer hardware and software.

The described hardware devices may be formed to be operated by at least one software module in order to perform the operations of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching.

Therefore, it is intended that the scope of the invention be defined by the claims appended thereto and their equivalents.

Although the present invention has been described in connection with the embodiment of the present invention illustrated in the accompanying drawings, it is not limited thereto since it will be apparent to those skilled in the art that various substitutions, modifications and changes may be made thereto without departing from the scope and spirit of the invention.

INDUSTRIAL APPLICABILITY

According to the present invention, a method and system for determining the validity of a command line are provided, which can rapidly determine whether a command line inputted from a terminal having a predetermined network address is invalid by establishing block network address information.

Also, according to the present invention, a method and system for determining the validity of a command line are provided, which establishes network address information with respect to a network address as invalid suspect network address information in case that it is difficult to determine whether a command line inputted from a terminal having a predetermined network address is invalid and can more precisely determine whether a command line is valid by using at least two establishment procedures of determining whether the network address information is determined to be block network address information by using a command line further inputted from the network address later.

Also, according to the present invention, a method and system for determining the validity of a command line are provided, which can show a new determination standard that can determine whether a command line is valid and determine whether the command line is valid by considering all request format and request content of the command line.

The invention claimed is:

1. A computer-implemented method of determining validity of a command line, comprising the steps of:
   maintaining a log database, said log database including log information associated with command lines, said log information including at least one of network address information included in the command line, input time point information with respect to the input time point of the command line, and the request content information;
   receiving a command line from a terminal of a user; and
   determining validity of said received command line based, at least in part, upon log information recorded in said log database, wherein the step of determining the validity of the command line based, at least in part, upon the log information recorded in the log database comprises:
   computing first number of the command for a first period by using the log information recorded in the log database for the first period for each of the request content information, respectively, in which the command line received from the terminal with the same network address is determined to be received from one terminal, said log information including at least said blocked network address information and request content information;
   computing the second number of the command line including the request content information from the command line received from the terminal with the network address for a second period by using the log information recorded in the log database for the second period; and
   determining the validity of the command line by using the first number for said each terminal and for said each of the request content information and the second number.

2. A computer-implemented method of determining validity of a command line, comprising the steps of:
   maintaining a log database, said log database including log information associated with command lines, said log information including at least one of network address information included in the command line, input time point information with respect to the input time point of the command line, and the request content information;
   receiving a command line from a terminal of a user; and
   determining validity of said received command line based, at least in part, upon log information recorded in said log database, wherein the steps further comprises:
   determining the command line generated in association with information communicated with a terminal of a user and inputted from the terminal as a second command line and determining the information as first information; and
   recording the log information corresponding to the information communicated with the terminal of the user,
   wherein the step of determining the validity of the command line based, at least in part, upon the log information comprises:
   determining the type of the command line based on the request content information;
   searching the log information corresponding to the first information associated with the command line in the log database in case that the command line is the second command line as the result of the determination; and
   determining the command line to be invalid in case that the log information is not searched.

3. A computer-implemented method of determining validity of a command line, comprising the steps of:
   maintaining a log database, said log database including log information associated with command lines, said log information including at least one of network address information included in the command line, input time point information with respect to the input time point of the command line, and the request content information;
   receiving a command line from a terminal of a user; and
   determining validity of said received command line based, at least in part, upon log information recorded in said log database, wherein:
   the step of receiving the command line comprises a step of controlling the command line to be encoded according to an encoding method, and
   the step of determining the validity of the command line based, at least in part, upon the request format comprises the steps of:
   determining whether the command line is decoded by a decoding method corresponding to the encoding method; and
   determining the command line to be invalid in case that the command line is not decoded by the decoding method as the result of the determination.

4. A computer-implemented method of determining validity of a command line, comprising the steps of:
   maintaining a log database, said log database including log information associated with command lines, said log information including at least one of network address information included in the command line, input time point information with respect to the input time point of the command line, and the request content information;
   receiving a command line from a terminal of a user; and
   determining validity of said received command line based, at least in part, upon log information recorded in said log database, wherein the steps further comprising:

computing a period between the point of time providing predetermined information and the point of time inputting the command line in case that the command line is generated based on the information provided to the terminal, and
determining the command line to be invalid in case that the period is less than a predetermined value.

5. A computer-implemented method of determining validity of a command line, comprising the steps of:
  maintaining a log database, said log database including log information associated with command lines, said log information including at least one of network address information included in the command line, input time point information with respect to the input time point of the command line, and the request content information;
  receiving a command line from a terminal of a user; and
  determining validity of said received command line based, at least in part, upon log information recorded in said log database, wherein the step of determining the validity of the command line based, at least in part, upon log information recorded in said log database comprises:
    computing the first number of the command line received for a first period by using the log information recorded in the log database for the first period for each of the request content information, respectively,
    computing the second number of the log information including the request content information included in the command line by using the log information recorded for a second period with reference to the log database, and
    determining the validity of the command line by using the first number for said each of the request content information and the second number.

6. A computer-implemented method of determining validity of a command line, comprising the steps of:
  maintaining a log database, said log database including log information associated with command lines, said log information including at least one of network address information included in the command line, input time point information with respect to the input time point of the command line, and the request content information;
  receiving a command line from a terminal of a user; and
  determining validity of said received command line based, at least in part, upon log information recorded in said log database, wherein the step of determining the validity of the command line based, at least in part, upon the log information recorded in the log database comprises:
    identifying a network group associated with the network address based on the network address information,
    computing the first number of the command line inputted from each terminal for a first period by using the log information recorded in the log database for each of the request content information, respectively, in which the command line received from the terminal with the same network address is determined to be inputted from one terminal,
    computing the second number of the command line including the network address information associated with the network group and the request content information for a second period by using the log information recorded in the log database, and
    determining the validity of the command line by using the first number and the second number.

7. A computer-implemented method of determining the validity of a command line received from a user, comprising the steps of:
  maintaining at least one log information in a log database, said log information being associated with at least one command line received from terminals of users, said log information including at least one predetermined information;
  receiving a command line from a terminal of a user;
  identifying at least one predetermined information included in said command line;
  searching log information recorded in said log database, said log information corresponding to said predetermined information which is included in said command line; and
  determining validity of said received command line by using said log information recorded in said log database, wherein if said received command line is determined to be a result-type command line in which said result-type command line is in response to a query-type command line, the step of searching the log information in said log database searches log information recorded in said log database, which includes query-type command information which corresponds to said result-type command, and
  said result-type command is determined to be invalid when the log information including said corresponding query-type command information is not searched.

* * * * *